3,264,263
POLYCARBONATE RECOVERY SYSTEM
Peter J. Baker, New Martinsville, W. Va., assignor to Mobay Chemical Company, Pittsburgh, Pa., a corporation of Delaware
Filed May 22, 1963, Ser. No. 282,289
10 Claims. (Cl. 260—47)

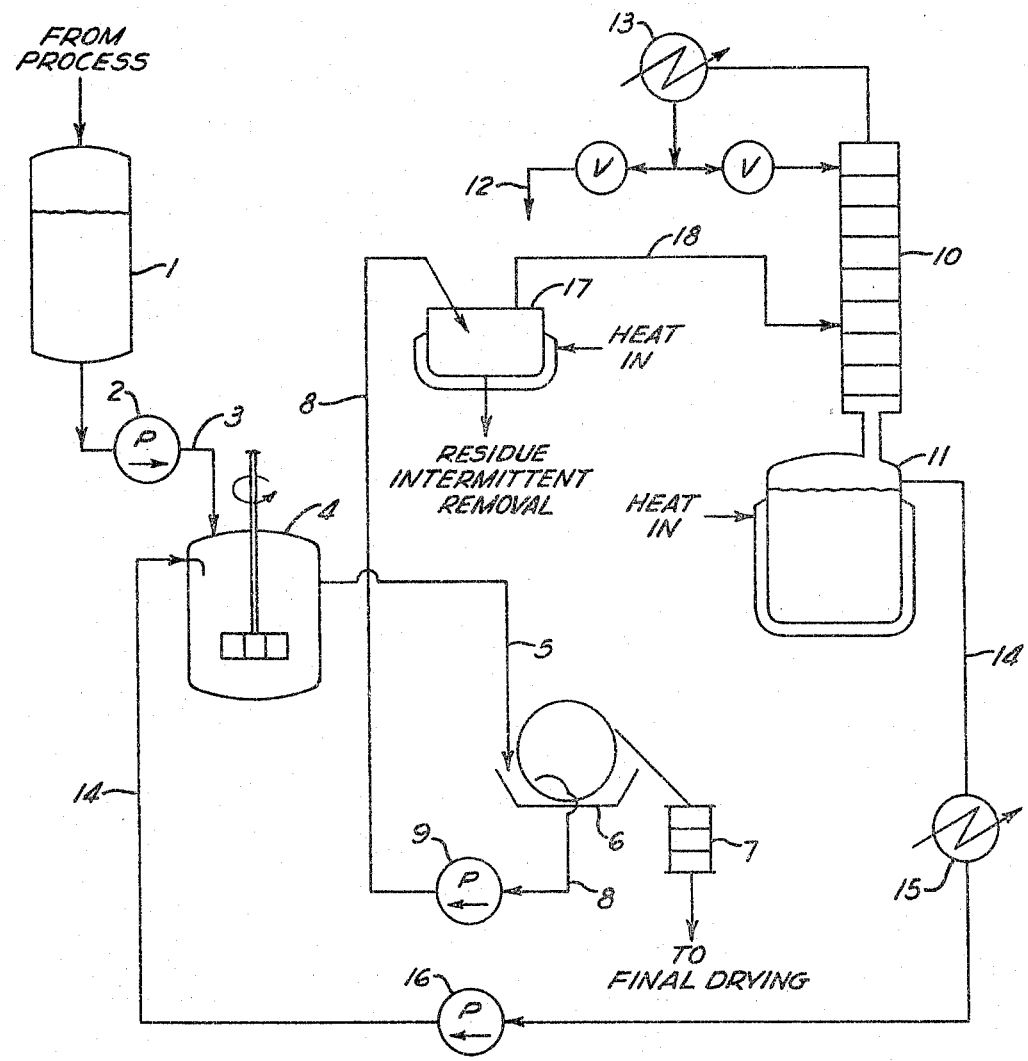

This invention relates to polycarbonates and more specifically to a novel process for the recovery of polycarbonates from solution.

Some known methods for the production of polycarbonates are disclosed in U.S. Patents 3,028,365; 3,043,800 and 3,043,802 and also in Canadian Patents 578,795; 594,405 and 611,970. The most commercially used process (as described in U.S. Patent 3,028,365) involves the phosgenation of 2,2-bis(4-hydroxy phenyl)propane to the desired polycarbonate material. This dihydroxy propane used is commonly called "Bisphenol A" and will be referred to as such throughout the remainder of this disclosure. This phosgenation of Bisphenol A takes place in the presence of an inert solvent, thereby resulting in a polycarbonate product in solution form. This solution generally consists of from about 1 to about 40% polycarbonate and the remainder the solvent used. For practical and commercial reasons, it is desirable that the polycarbonate formed by this process be removed from solution and recovered in a substantially solid form. The solid polycarbonate thus removed is usually then dried and pelletized for future use in the production of polycarbonate products.

There are some polycarbonate products that must be made from polycarbonate raw materials of exceptionally high impact strength and premium quality. For example, items such as safety helmets, sporting equipment, airplane canopies and other airplane parts, motor housing and automotive parts must be made of polycarbonate materials of very high impact strength. While presently known procedures used to remove solid polycarbonate from solution have been somewhat satisfactory, the majority of them do not provide the recovery of polycarbonate having exceptionally high impact strength or of high quality make-up. Those precipitation procedures that do involve the recovery of solid polycarbonates having high impact strength generally are processes which involve a step resulting in complete separation of solvent from the precipitating non-solvent. Because of the presence of unrecovered polycarbonate in the solvent-non-solvent mix of the prior art methods, complete separation of solvent and non-solvent becomes relatively difficult and expensive. This difficulty has been attributed to the fact that the unrecovered polycarbonate remaining in this solution is deposited on the heat transfer surface thus impedes the proper heat transfer.

It is, therefore, an object of this invention to provide a process for recovery of polycarbonates from solution which is devoid of the above-noted disadvantages. It is another object of this invention to provide a method for the production of polycarbonate materials having increased impact strength. Another object of this invention is to provide a process for the recovery of polycarbonate from solution whereby the difficult steps of complete separation of solvent and non-solvent is avoided. A still further object of this invention is to provide a process whereby a polycarbonate of high quality is produced. A still further object of this invention is to provide a continuous process for the convenient recovery of polycarbonates from a solution thereof.

The foregoing objects and others which will become apparent from the following description are accomplished in accordance with this invention, generally speaking, by providing a continuous process for the recovery of high quality polycarbonates from a solution thereof which comprises continuously mixing a polycarbonate solution with a precipitating solution until at least some of the polycarbonate precipitates from solution and a slurry or mixture is obtained. The content of this slurry is controlled as it leaves the mixing vessel so as to contain from about 1 to about 15 parts (by weight) polycarbonate with a mixture of from about 35 to about 65 parts of a polycarbonate solvent and from about 35 to about 65 parts of a polycarbonate non-solvent. After this slurry leaves the mixing vessel, the precipitated polycarbonate is separated from the liquid phase at a first separation means and the liquid phase passed to a second separation means. At this second separation means the unrecovered polycarbonate portion of this liquid phase is removed leaving thereby a mixture of solvent and non-solvent. This mixture is then passed to a third separation means where substantially all of the solvent which was added to the mixing vessel via the polycarbonate solution is removed. The solvent-non-solvent mixture remaining is then continuously recycled to the mixing vessel where it is mixed with a fresh supply of polycarbonate solution.

In a preferred embodiment of this invention, a 7 to 25% polycarbonate solution is used together with a precipitating solution composed of methylene chloride solvent and heptane as the non-solvent. The preferred ranges of the solvent and non-solvent in the precipitated solution is from about 35 to 65 parts by weight of methylene chloride and from about 35 to 65 parts heptane. Optimum results are obtained (when using this preferred embodiment) when the mixing is conducted at a temperature of from about 20 to 25° C. The amounts of polycarbonate solution and precipitating solution that are mixed are continuously controlled so that the mixture of slurry leaving the mixing vessel contains from about 1 to about 15 parts (by weight) solid polycarbonate, from about 35 to about 65 parts solvent and from about 35 to 65 parts non-solvent. From the mixing vessel the resulting mix containing the precipitated polycarbonate is continuously withdrawn and passed through a filtration means where the precipitated polycarbonate is removed from the slurry. The filtrate is then passed through a separator where the liquid portion of the filtrate is separated by distillation from the unrecovered polycarbonate. This separation is accomplished by heating the filtrate in a residue pan. The residue pan has anchor agitators and a relatively large heat transfer surface to volume ratio and is therefore able to cope with viscous, slurry-like material. The solvent-non-solvent is nearly totally evaporated here without a separation step. When the content becomes too viscous because of the polycarbonate left in the pan (as shown, for example, by the agitator power load or by a drop-off in heat transfer) a portion or all of the bottoms is drawn off. The bottoms may be filtered to recover some additional solvent-non-solvent mixture which can be returned to the still. The residual net filtrate consists almost entirely of low molecular weight polycarbonate, for example, very little of it is over 5000 molecular weight (normal polycarbonate is 20,000+ molecular weight). The distillate or vaporized portion is passed through a solvent removal means where a portion of the solvent is separated from the remaining solution in an amount which must substantially be equal to that amount of solvent that was initially added to the polycarbonate mixture via the polycarbonate solution. After the removal of this solvent a solution remains which contains substantially only solvent and non-solvent; this precipitating solution is then continuously recycled to the mixing vessel where it is mixed with a fresh supply of polycarbonate solution.

Various solvents and non-solvents may be used in the process of this invention depending upon the particular solvent used in the initial polycarbonate production process. The solvent and non-solvent used must be chemically inert to each other and to the components of the polycarbonate solution and they must be miscible with each other. The boiling point of the solvent must be lower than that of the non-solvent used. Some of the solvents which may be used in the present invention include methylene chloride, tetrachloroethane, ethylene dichloride, chloroform, trichloroethane, 1,2-dichloroethane, thiophene, dioxane, tetrahydrofuran, chlorobenzene, dichlorobenzene and mixtures thereof. Generally speaking, a good solvent for polycarbonate is one which will dissolve from about 1 to 30 parts of polycarbonate in about 70 to 100 parts of solvent. The non-solvents used in the present invention are chemically inert toward polycarbonate and the polycarbonate solvent materials. These materials generally are liquids whereby less than from about 0.1 to 1 part of polycarbonate is soluble in about 100 parts of non-solvent. By "dilute polycarbonate solution" is meant a solution containing from about 1 to about 30 to 40% polycarbonate.

Typical non-solvents that can be used in the present invention are aliphatic hydrocarbons having up to about 20 carbon atoms such as, for example, n-heptane, n-hexane, n-pentane, n-octane, n-nonane, n-decane, n-unodecane, 2-methyl pentane, 3-methyl pentane, 2,2-dimethyl butane, 2,3-dimethyl butane and the various heptanes particularly the isomers such as 2-methyl hexane, 3-methyl hexane, 2,2-dimethyl pentane, 2,3-dimethyl pentane, 3-ethyl pentane, 2,2,3-trimethyl butane and mixtures thereof. Other non-solvents are acetone, ethyl acetate, toluene, trichloroethylene, carbon tetrachloride, nitromethane, acetonitrile, 1,1-dichloroethane and dialkyl carbonates. Also n-liquid monohydric and dihydric alcohols may be used as the non-solvent of the present invention. Typical alcohols are isobutanol, secondary butanol, n-butanol, methanol, ethanol, propanol, n-hexyl alcohol and mixtures thereof.

Various polycarbonate solutions may be used in the process of this invention, such as, for example, polycarbonate solutions containing from about 1 to 30 or 40% polycarbonate. It is preferred, however, to use a polycarbonate solution containing from about 7 to about 20% polycarbonate.

The following examples and description in relation to the accompanying drawing will further define the particulars of the present invention. The figure illustrated is a schematic illustration of the present process. Parts in the examples are by weight unless otherwise specified.

*Example 1*

A 10% polycarbonate solution is added to a precipitation vessel 4 containing a polycarbonate precipitating solution maintained at a temperature of about 20 to 25° C. The 10% polycarbonate solution used is made by the phosgenation of Bisphenol A using a methylene chloride solvent in the manner disclosed in above-noted U.S. Patent 3,028,365. The precipitating solution used contains about 56% heptane and about 44% methylene chloride. Pump 2 is adjusted so as to pump the polycarbonate solution through conduit 3 at a substantially constant rate. The 10% polycarbonate solution is added to the mixing vessel 4 from polycarbonate storage tank 1 at a continuous rate of about 100 lbs./hr. while an approximately 56% heptane and 44% methylene chloride solution recycle precipitating solution stream is added via conduit 14 at a rate of about 300 lbs./hr. while constantly agitating or mixing these two components. The resulting slurry then overflows the precipitation vessel 4 and is passed to a filter means 6 via overflow conduit 14 where the precipitated polycarbonate is filtered off. The overflow slurry rate is about 10 lbs./hr. solid polycarbonate, about 200 lbs./hr. methylene chloride and about 168 lbs./hr. of heptane. The filter cake obtained after filtration is transferred to a collection means or a final drying means 7 where it may be further processed. The filtrate remaining contains unrecovered polycarbonate dissolved or dispersed in a solution of methylene chloride and heptane. This solution contains about 57% methylene chloride and about 43% heptane. The amount of unrecovered polycarbonate depends on the initial quality and the molecular weight distribution of the polycarbonate feed that is used. The filtrate is then at a rate of about 390 lbs./hr. passed through conduit 8 and pump means 9 to a residue pan 17 where the unrecovered polycarbonate is separated from the liquid portion of the filtrate in the manner described above. The temperature of the residue pan 17 is maintained at about 95° C. The vapor portion distilled from the residue pan via conduit 18 is transferred to a fractionation column 10 maintained at a bottoms temperature of about 50° C. where essentially pure methylene chloride is removed as overhead and condensed at condensing means 13. This methylene chloride is then drawn off from conduit 12. The methylene chloride removed is about equal in weight to the methylene chloride added to the system with the fresh polycarbonate feed through feed conduit 3 in this case about 90 lbs./hr. The still bottoms 11 (which is a mixture of methylene chloride and heptane) from the distillation means reboiler 10 are then transferred to the mixing vessel 4 at a rate of about 300 lbs./hr. This solution contains about 44% methylene chloride and 56% heptane and does not contain any unrecovered polycarbonate. This solution is continuously recycled to the mixing vessel 4 where it is mixed with a fresh supply of a polycarbonate solution at a temperature of about 20 to 25° C.

Compared to a sample of the polycarbonate isolated by simple evaporation processing, the resulting polycarbonate had improved impact strength, and narrowed molecular weight distribution as shown in the table below:

| | Parts by weight | Number average molecular weight, $M_n$ | Weight average molecular weight, $M_w$ | Polydispersity ratio, $M_w/M_n$ | ¼" IZOD impact, ft.-lb./inch notch |
|---|---|---|---|---|---|
| I | 100 | 27,000 | 39,000 | 1.45 | 2.4 |
| II | 92 | 29,000 | 42,000 | 1.08 | 3.1 |
| III | 8 | 3,600 | 12,000 | | |

I = Isolated by simple evaporation processing.
II = Precipitated product of the present invention.
III = Discard, recovered from residue pan in present invention.

This tabulation clearly shows that the present process selectively removes the polycarbonate lower molecular weight species. It is possible that the improved (narrowed) molecular weight distribution is the cause of the improved impact strength which is one of the most important properties considered when selecting polycarbonate as the plastic to be used. In the simple evaporation process, the solvent was merely evaporated from the polycarbonate solution and the remaining solid collected.

Example 2

Another 10% polycarbonate solution made as in the above example is converted to solid polycarbonate in the manner shown in Example 1. This polycarbonate starting material had a different initial molecular weight distribution as shown in the tabulation below. Again, a marked improvement in impact strength is observed upon isolation of the product by this process as compared to that isolated by simple evaporation processing.

|     | Parts by weight | Number average molecular weight, $M_n$ | Weight average molecular weight, $M_w$ | Polydispersity ratio, $M_w/M_n$ | ¼″ IZOD impact, ft.-lb./inch notch |
|-----|-----|-----|-----|-----|-----|
| I   | 100 | 24,800 | 37,200 | 1.50 | 2.45 |
| II  | 90  | 30,100 | 38,600 | 1.28 | 3.45 |
| III | 10  | Not available | | | |

I = Isolated by simple evaporation processing.
II = Precipitated product of the present invention.
III = Discard, recovered from residue pan in present invention The process of Example 1 was followed in Examples 3 to 6, except that various polycarbonate and precipitating solutions were used. The table below indicates the various components involved in these further examples.

| Example | Polycarbonate solution mixed | Precipitating solution mixed | Addition rate of polycarbonate solution | Addition rate of precipitating solution | After filtration recycle rate of filtrate to still | Amount of solvent removed at still | Content of mixture after removal of solvent and recycled to mixing vessel |
|---|---|---|---|---|---|---|---|
| 3 | 15% p.c. / 85% m.c. | 39% m.c. / 61% hep. | 100 lbs./hr | 400 lbs./hr | 480 lbs./hr | 85 lbs./hr | 39% m.c. / 61% hep. |
| 4 | 20% p.c. / 80% m.c. | 56% m.c. / 44% hep. | 100 lbs./hr | 300 lbs./hr | 380 lbs./hr | 80 lbs./hr | 56% m.c. / 44% hep. |
| 5 | 25% p.c. / 75% m.c. | 49% m.c. / 51% hep. | 100 lbs./hr | 1150 lbs./hr | 1225 lbs./hr | 75 lbs./hr | 49% m.c. / 51% hep. |
| 6 | 25% p.c. / 75% m.c. | 38% m.c. / 62% hep. | 100 lbs./hr | 260 lbs./hr | 335 lbs./hr | 75 lbs./hr | 38% m.c. / 62% hep. | p.c. = polycarbonate. m.c. = methylene chloride. hep. = heptane.

Although specific solvents, non-solvents, polycarbonate solutions and conditions have been specified in the above examples, the other components and conditions discussed in the disclosure give results similar to those indicated in the above examples.

Although the invention has been described in considerable detail for the purpose of illustration, it is to be understood that variations can be made by those skilled in the art without departing from the spirit of the invention and scope of the claims.

What is claimed is:

1. A continuous process for separating polycarbonate from its solvent in a solution thereof to form polycarbonate having high impact strength which comprises continuously mixing in a mixing means a polycarbonate solution and a precipitating solution, said precipitating soluton comprsng a polycarbonate solvent and a polycarbonate non-solvent, said solvent being miscible with and having a boiling point lower than the boiling point of the non-solvent, to form a mixture comprising from about 1 to 15 parts by weight of precipitated polycarbonate, from about 35 to 65 parts by weight of polycarbonate solvent and from about 35 to 65 parts by weight polycarbonate non-solvent, separating the precipitated polycarbonate from the resulting mixture, removing from the remainder of the mixture the unprecipitated polycarbonate and subsequently removing the remainder of the mixture that amount of polycarbonate solvent which was initially added to said mixing means via said polycarbonate solution and continuously recycling the resulting solution to said mixing means where it is mixed with fresh polycarbonate solution.

2. A continuous process for separating polycarbonate from its solvent in a solution thereof to form polycarbonate having high impact strength which comprises continuously mixing in a mixing means a polycarbonate solution and a precipitating solution, said precipitating soluton comprising a polycarbonate solvent and a polycarbonate non-solvent, said solvent being miscible with and having a boiling point lower than the boiling point of said non-solvent to form a mixture comprising from 1 to 15 parts by weight of precipitated polycarbonate, from about 35 to 65 parts by weight of polycarbonate solvent and from about 35 to about 65 parts by weight of polycarbonate non-solvent, removing from the resulting mixture at a first separation means said precipitated polycarbonate, and subsequently passing the remainder of the mixture to a second separation means whereby unrecovered polycarbonate is separated from the liquid phase of said mixture, leaving remaining thereby said liquid phase comprising a polycarbonate solvent and a polycarbonate non-solvent mixture, removing from said mixture that amount of polycarbonate solvent which was initially added to said mixing means via said polycarbonate solution and continuously recycling the remaining solution to said mixing means where it is mixed with fresh polycarbonate solution.

3. The process of claim 2 wherein said polycarbonate solution contains from about 1 to about 40% by weight of polycarbonate.

4. The process of claim 2 wherein said solvent is selected from the group consisting of methylene chloride, tetrachloroethane, chloroform, trichloroethane, 1,2-dichloroethane, thiophene, dioxane, tetrahydrofuran, chlorobenzene, dichlorobenzene and mixtures thereof.

5. The process of claim 2 wherein said non-solvent is selected from the group consisting of aliphatic hydrocarbons of from about 5 to 20 carbon atoms, acetone, ethyl acetate, toluene, trichloroethylene, carbon tetrachloride, nitromethane, acetonitrile, 1,1-dichloroethane, dialkyl carbonates, monohydric alcohols, dihydric alcohols and mixtures thereof.

6. The process of claim 2 wherein said non-solvent is hexane.

7. The process of claim 2 wherein said non-solvent is heptane.

8. The process of claim 2 wherein said solvent is methylene chloride.

9. The process of claim 2 wherein said polycarbonate solution is a 10% by weight of polycarbonate solution with a methylene chloride solvent.

10. A continuous process for separating polycarbonate from its solvent in a solution thereof to form polycarbonate having high impact strength which comprises continuously mixing in a mixing means a polycarbonate solution and a precipitating solution, said precipitating solution comprising from about 35 to 65% by weight of methylene chloride and the remainder heptane, obtaining a resulting mixture comprising from about 1 to 15% by weight of precipitated polycarbonate, from about 35 to 65% by weight of polycarbonate solvent and the remainder polycarbonate non-solvent, passing the resulting mixture to a filtration means whereby said precipitated polycarbonate is filtered off and recovered, thereby obtaining a filtrate comprising unrecovered polycarbonate and a liquid phase comprising methylene chloride and heptane, removing from said filtrate said unrecovered polycarbonate, thereby leaving said liquid phase containing methylene chloride and heptane, removing from said liquid phase that amount of methylene chloride which was initially added to said mixing vessel via said polycarbonate solution, and continuously recycling the remaining methylene chloride-heptane solution to said mixing means where it is continuously mixed with a fresh polycarbonate solution.

References Cited by the Examiner

UNITED STATES PATENTS 3,065,204   11/1962   Dietrich et al. _____ 260—47 X
3,144,432   8/1964   Fox _____ 260—47 X

OTHER REFERENCES

Chemical Engineering, Nov. 14, 1960, pp. 174–177.

SAMUEL H. BLECH, *Primary Examiner.*